(12) United States Patent
Bolourchi et al.

(10) Patent No.: US 12,162,482 B2
(45) Date of Patent: Dec. 10, 2024

(54) ALWAYS ON LATERAL ADVANCED DRIVER-ASSISTANCE SYSTEM

(71) Applicant: STEERING SOLUTIONS IP HOLDING CORPORATION, Saginaw, MI (US)

(72) Inventors: Farhad Bolourchi, Novi, MI (US); Jeffery A. Zuraski, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 308 days.

(21) Appl. No.: 17/733,305

(22) Filed: Apr. 29, 2022

(65) Prior Publication Data

US 2022/0348197 A1 Nov. 3, 2022

Related U.S. Application Data

(60) Provisional application No. 63/182,358, filed on Apr. 30, 2021.

(51) Int. Cl.
*B60W 30/095* (2012.01)
*B60W 30/12* (2020.01)

(52) U.S. Cl.
CPC ........ *B60W 30/0956* (2013.01); *B60W 30/12* (2013.01); *B60W 2552/10* (2020.02); *B60W 2554/4041* (2020.02); *B60W 2710/202* (2013.01)

(58) Field of Classification Search
CPC ............. B60W 30/0956; B60W 30/12; B60W 2552/10; B60W 2554/4041; B60W 2710/202; B60W 30/18163; B60W 10/20; B60W 30/0953; B60W 2540/18; B60W 2554/00; B60W 2554/802; B60W 30/08;
(Continued)

(56) References Cited

U.S. PATENT DOCUMENTS

2016/0137200 A1* 5/2016 Wang ................ B60W 50/0225
701/1
2018/0290650 A1* 10/2018 Ryne .................... B60W 10/20
(Continued)

FOREIGN PATENT DOCUMENTS

DE 102007002220 A1 7/2007
DE 102006027325 A1 12/2007
DE 102007007540 A1 8/2008
(Continued)

*Primary Examiner* — Muhammad Shafi
(74) *Attorney, Agent, or Firm* — Dickinson Wright PLLC

(57) ABSTRACT

A method includes, in response to an ignition on signal: determining, using one or more sensors, whether a host vehicle is moving from a first lane to a second lane; determining, using one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, performing at least one operator assistance maneuver; and, in response to a determination that an object is not in at least one of the blind zone of the host vehicle and in the second lane within the threshold distance of the vehicle, not performing the at least one operator assistance maneuver.

18 Claims, 7 Drawing Sheets

(58) Field of Classification Search
CPC .............. B62D 15/025; B62D 15/0255; B62D 15/0265
USPC ........................................................ 701/26
See application file for complete search history.

(56) References Cited

U.S. PATENT DOCUMENTS

2020/0180638 A1* 6/2020 Kanoh ................ B60W 30/095
2022/0097709 A1* 3/2022 Adam ................ B60W 60/0051

FOREIGN PATENT DOCUMENTS

| DE | 102014219110 A1 | 3/2016 |
| DE | 102015214573 A1 | 2/2017 |
| DE | 102016201070 A1 | 7/2017 |
| EP | 2008894 | * 12/2008 |

* cited by examiner

ALWAYS ON LATERAL ADVANCED DRIVER-ASSISTANCE SYSTEM

CROSS-REFERENCES TO RELATED APPLICATIONS

This patent application claims priority to U.S. Provisional Patent Application Ser. No. 63/182,358, filed Apr. 30, 2021 which is incorporated herein by reference in its entirety.

TECHNICAL FIELD

This disclosure related to advanced driver-assistances systems and, in particular, to always on lateral advanced driver-assistance system functions.

BACKGROUND

Vehicles, such as cars, trucks, sport utility vehicles, crossovers, mini-vans, marine craft, aircraft, all-terrain vehicles, recreational vehicles, or other suitable vehicles, are increasingly including driver assistance features, such as advanced driver-assistance systems. Such systems may provide lane keep features, lane centering features, and the like that assist an operator of a vehicle in maintaining a lane, avoiding a collision, maintaining a position in the line, and the like.

Typically, such systems require an operator selection to engage a corresponding feature of the system (e.g., to turn the feature on and/or off). For example, a lane keep feature may remain off until the operator selects (e.g., using a button or other suitable selection device) the lane keep feature, at which point the lane keep feature will engage and provide lane keep assistance to the operator. Such selection may be considered tedious to the operator, as operation of the vehicle includes various other buttons, actuators, selections, and engagement by the operator. Additionally, or alternatively, at least some features of such systems my not perform as the operator expects. Consequently, such system features may remain off and not used be operator. Reasons for not using such system features may include operator distrust of one or more features, environmental sensors (e.g., radio detection and ranging sensors, image capturing sensors, and the like) may provide inaccurate information for controlling various aspects of the vehicle due to dust, dirt, snow, rain, sunlight, and the like. Further, the overall control action of such features may not provide a desired operating feel to the operator, and in particular may not provide desirable steering feel to the operator.

SUMMARY

This disclosure relates generally to advanced driver-assistance systems.

An aspect of the disclosed embodiments includes a method for providing vehicle operator assistance. The method includes, in response to an ignition on signal: determining, using at least one first value corresponding to one or more sensors, whether a host vehicle is moving from a first lane to a second lane; in response to a determination that the host vehicle is moving from the first lane to the second lane, determining, using at least one second value corresponding to the one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, performing at least one operator assistance maneuver; and, in response to a determination that an object is not in at least one of the blind zone of the host vehicle and in the second lane within the threshold distance of the vehicle, not performing the at least one operator assistance maneuver.

Another aspect of the disclosed embodiments includes a system for providing vehicle operator assistance. The system includes a processor and a memory. The memory includes instructions that, when executed by the processor, cause the processor to, in response to an ignition on signal: determine, using at least one first value corresponding to one or more sensors, whether a host vehicle is moving from a first lane to a second lane; in response to a determination that the host vehicle is moving from the first lane to the second lane, determine, using at least one second value corresponding to the one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, perform at least one operator assistance maneuver; and, in response to a determination that an object is not in at least one of the blind zone of the host vehicle and in the second lane within the threshold distance of the vehicle, not performing the at least one operator assistance maneuver.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
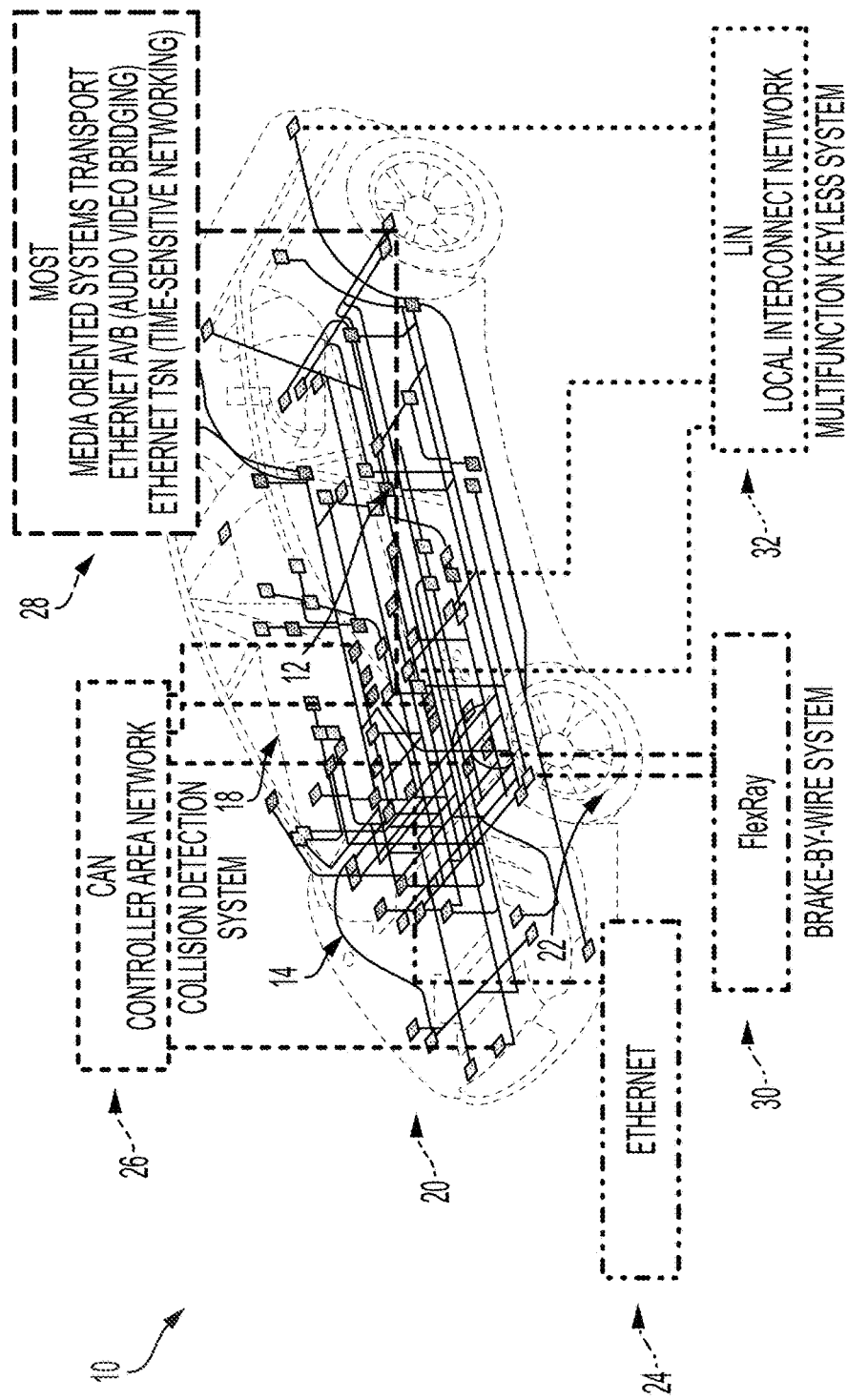
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, are increasingly including driver assistance features, such as advanced driver-assistance systems. Such systems may provide lane keep features, lane centering features, and the like that assist an operator of a vehicle in maintaining a lane, avoiding a collision, maintaining a position in the line, and the like.

Typically, such systems require an operator selection to engage a corresponding feature of the system (e.g., to turn the feature on and/or off). For example, a lane keep feature may remain off until the operator selects (e.g., using a button or other suitable selection device) the lane keep feature, at which point the lane keep feature will engage and provide lane keep assistance to the operator. Such selection may be considered tedious to the operator, as operation of the vehicle includes various other buttons, actuators, selections, and engagement by the operator.

Additionally, or alternatively, at least some features of such systems my not perform as the operator expects. Consequently, such system features may remain off and not used be operator. Reasons for not using such system features may include operator distrust of one or more features, environmental sensors (e.g., radio detection and ranging sensors, image capturing sensors, and the like) may provide inaccurate information for controlling various aspects of the vehicle due to dust, dirt, snow, rain, sunlight, and the like. Further, the overall control action of such features may not provide a desired operating feel to the operator, and in particular may not provide desirable steering feel to the operator.

Accordingly, systems and methods, such as those described herein, that eliminate an operator selection for engaging advanced driver assistance system (ADAS) features (e.g., which may leave such features on continuously), may be desirable. In some embodiments, the systems and methods described herein may be configured to provide an operator selection for disengaging the ADAS features based on various production requirements.

The systems and method described herein may be configured to take no action in vehicle operation is not perfect (e.g., below an ideal operating threshold), while vehicle operation is still considered safe. The systems and method described herein may be configured to perform relatively minimal actions (e.g. undetectable by the operator) to assist the operator in vehicle operation. The systems and method described herein may be configured to provide ideal operator and/or full vehicle autonomy, under certain circumstances. Additionally, or alternatively, the systems and method described herein may be configured to provide semi-autonomous vehicle operation. The systems and method described herein may be configured to take action only in the event that the vehicle is likely to be involved in an unsafe situation.

In some embodiments, the systems and method described herein may be configured to engage features of the ADAS when an ignition of the vehicle is engages (e.g., turned on), which may allow such features to stay engaged throughout operation of the vehicle (e.g., unless disengaged by the operator if the vehicle includes a disengage selection), Such features may include a blind zone assist feature, a lane keep feature, a lane centering feature, a road keep feature, a collision avoidance feature, other suitable features, or a combination there.

In some embodiments, the systems and method described herein may be configured to allow such features to be always on and to only intervene when the operator is doing something unsafe or when operator is not reacting to an unsafe situation. For example, if the operator is operating the vehicle on a highway and drifts from one lane to the next (e.g., signaled or unsignaled), the systems and methods described herein may be configured to take no action if there is no danger in that movement. Alternatively, the systems and methods described herein may be configure to intervene (e.g., take action) if there is another vehicle or object in that lane or in the blind zone of the vehicle. For example, the systems and methods described herein may be configured to intervene and push the vehicle back to an original lane of travel. Additionally, or alternatively, if there is no lane next to the original lane of travel and the operator is drifting off of the road, the systems and methods described herein may be configured to push the vehicle back to the original lane of travel (e.g., this may be referred to as road keeping).

Figure 3C:
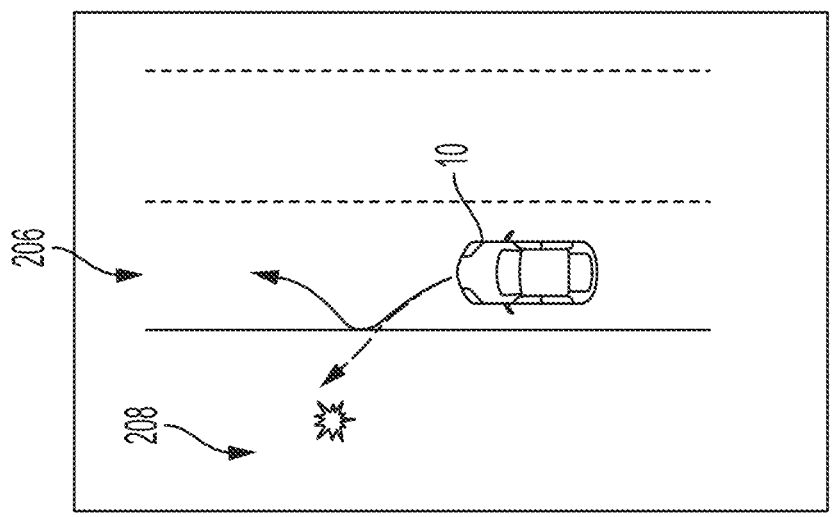
FIGS. 3A-3E generally illustrate a vehicle traversing various lanes of a road according to the principles of the present disclosure.
Figure 3B:
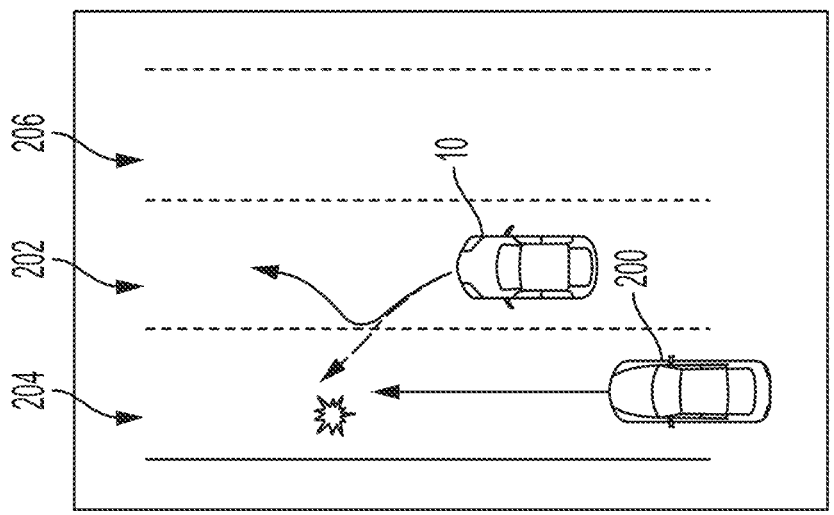
Figure 3A:
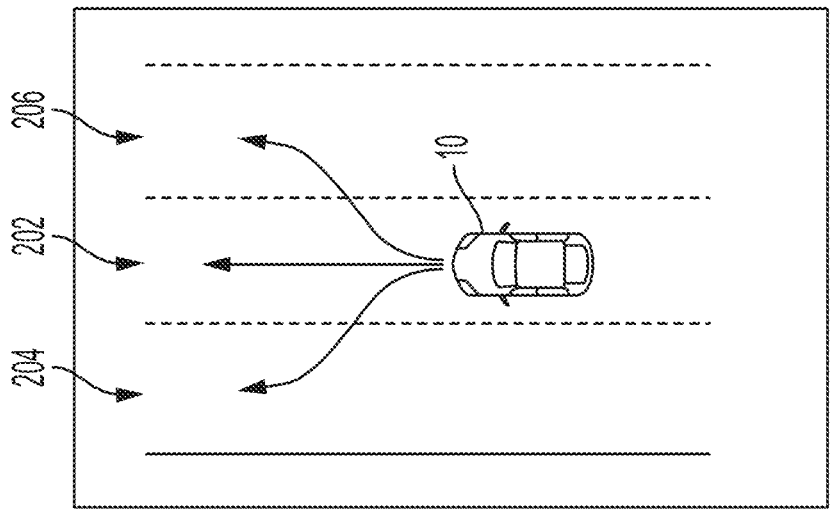

In some embodiments, as is generally illustrated in FIG. 3A, the systems and methods described herein may be configured to not provide the operator with any perceivable assistance and/or intervention, because the vehicle 10, as will be described, is not in any danger (e.g., even if the operator changes lanes without using a signal).

In some embodiments, as is generally illustrated in FIG. 3B, the systems and methods described herein may be configured to provide a pushback assist to the vehicle 10 based on the vehicle 200 being in a blind zone of the vehicle 10.

In some embodiments, as is generally illustrated in FIG. 3C, the systems and methods described herein may be configured to provide a pushback assist to the vehicle 10 based on the drift of the vehicle 10 being dangerous (e.g., because the vehicle 10 is going off of the road).

In some embodiments, the systems and methods described herein may be configured to, when providing operator assistance, provide a relatively small amount of torque overlay (e.g., in electronic power steering systems) and/or a relatively small amount of position overlay (e.g., in steer-by-wire steering systems) that move the vehicle away from the identified danger, while not moving the vehicle far enough to enter another lane (e.g., the vehicle may be moved 75 centimeters or other suitable amount). The torque overlay may include a closed loop or any open look torque overlay.

Figure 3D:
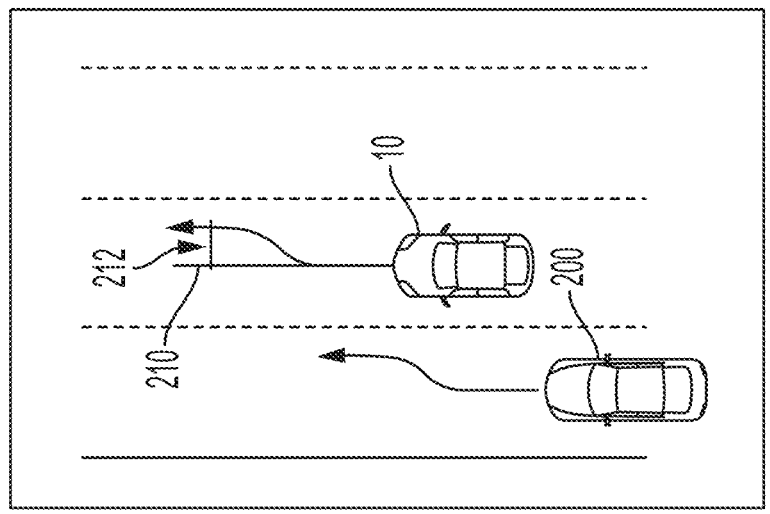

In some embodiments, as is generally illustrated in FIG. 3D, the systems and methods described herein may be configured to use various sensors of the vehicle 10 to determine that the vehicle 200 is drifting toward the vehicle 10 (e.g., which may indicate a dangerous situation or potential collision, particularly if the vehicle 200 is relatively large). The systems and methods described herein may be configured to provide enough operator assistance to the vehicle 10 to move the vehicle 10 seamlessly in the lane by adding torque overlay to a (reduced) base assist function and/or by adding position overlay to the base assist function.

In some embodiments, the systems and methods described herein may be configured to determine, using various sensors of the vehicle, that the vehicle is traveling relatively straight in the lane. The systems and methods described herein may be configured to provide a relatively lane centering assistance to keep the vehicle relatively center in the lane, which may reduce operator fatigue on longer trips. The lane centering assistance may be configured such that, when applied, the assistance is undetectable by the operator (e.g., with the operator hands on or off of the steering wheel), and not enough to maintain the center of the lane with any substantial curve in the road (e.g., if the operator hands are off of the steering wheel).

In some embodiments, the systems and methods described herein may be configured to provide ADAS features without an operator selection button, provide active interventions having steering feel performance that is desirable to the operator, provide assistance to the operator in operator created dangerous situations (e.g., blind zone assist, lane keep, and the like), provide assistance in situations created by other operators (e.g., move away assist, pushback assist, and the like), and provide relatively limited lane centering assistance.

In some embodiments, the systems and methods described herein may be configured to, in response to an ignition on signal: determine, using at least one first value corresponding to one or more sensors, whether a host vehicle is moving from a first lane to a second lane; in response to a determination that the host vehicle is moving from the first lane to the second lane, determine, using at least one second value corresponding to the one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, perform at least one operator assistance maneuver; and, in response to a determination that an object is not in at least one of the blind zone of the host vehicle and in the second lane within the threshold distance of the vehicle, not performing the at least one operator assistance maneuver.

In some embodiments, the object includes a target vehicle. In some embodiments, the host vehicle includes an electronic power steering system. In some embodiments, the systems and methods described herein may be configured to perform the at least one operator assistance maneuver by providing a torque overlay to at least one component of the electronic power steering system to direct the host vehicle away from at least one of the object and the second lane.

In some embodiments, the host vehicle includes a steer-by-wire steering system. In some embodiments, the systems and methods described herein may be configured to perform the at least one operator assistance maneuver by providing a position overlay to at least one component of the steer-by-wire steering system to direct the host vehicle away from at least one of the object and the second lane.

In some embodiments, the systems and methods described herein may be configured to, in response to the ignition on signal: determine, using at least one third value corresponding to the one or more sensors, whether the host vehicle is moving off of a road being traversed by the host vehicle; and, in response to a determination that the host vehicle is moving off of the road being traversed by the host vehicle, perform the at least one operator assistance maneuver.

In some embodiments, the systems and methods described herein may be configured to, in response to the ignition on signal: determine, using at least one fourth value corresponding to the one or more sensors, whether the host vehicle is drifting away from a center of the first lane; and, in response to a determination that the host vehicle is drifting away from the center of the first lane, perform at least one other operator assistance maneuver.

In some embodiments, the systems and methods described herein may be configured to perform at least one other operator assistance maneuver by providing lane centering for the host vehicle. In some embodiments, the lane centering is less than a lane centering threshold.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
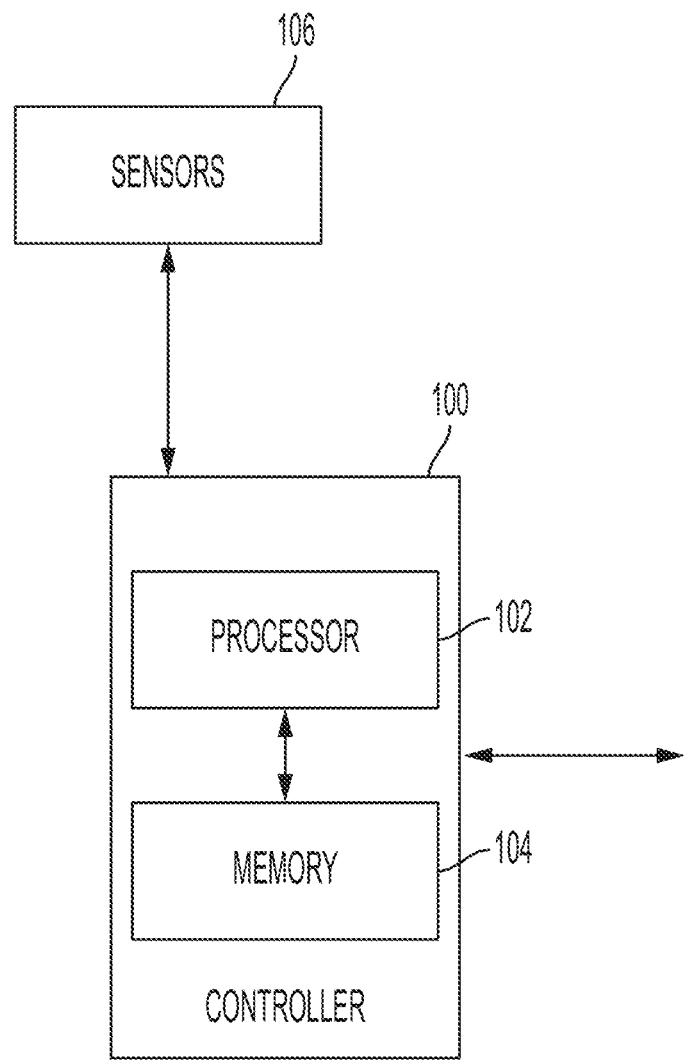
FIG. 2 generally illustrates a vehicle operator assistance system including a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the sensors 106 may include one or more image capturing devices (e.g., such as a camera), one or more audio input devices (e.g. such as a microphone), one or more global positioning devices, one or more proximity sensing devices, one or more radar sensors, one or more light detecting and ranging sensors, one or more ultrasonic sensors, other suitable sensors or devices, or a combination thereof.

In some embodiments, as is generally illustrated in FIGS. 3A-3E, the controller 100 may be configured to, in response to an ignition on signal (e.g., which may include any signal indicating the vehicle is in a condition for operation), determine, using at least one first value corresponding to the sensors 106, whether vehicle 10 (e.g., which may be referred to herein as the host vehicle) is moving from a first lane 202 to a second lane 204.

The controller 100 may, in response to a determination that the vehicle 10 is moving from the first lane 202 to the second lane 204, determine, using at least one second value corresponding to the sensors 106, whether an object, such as the vehicle 200, is in a blind zone of the vehicle 10 or in the second lane 204 within a threshold distance of the vehicle 10. The threshold distance any include any suitable distance and may indicate a potential collision with the vehicle 10.

The controller 100 may, in response to a determination that the vehicle 200 is in one of the blind zone of the vehicle 10 or in the second lane 204 within the threshold distance of the vehicle 10, perform at least one operator assistance maneuver. The operator assistance maneuver may include any suitable maneuver, including, but not limited to, those described herein.

Alternatively, the controller 100, in response to a determination that vehicle 200 is not in one of the blind zone of the vehicle 10 or in the second lane 204 within the threshold distance of the vehicle 10, may take no action.

In some embodiments, as described, the vehicle 10 may include an electronic power steering system. The controller 100 may perform the at least one operator assistance maneuver by providing a torque overlay to at least one component of the electronic power steering system to direct the vehicle 10 away from the vehicle 200 and/or the second lane 204.

In some embodiments, as described, the vehicle 10 may include a steer-by-wire steering system. The controller 100 may perform the at least one operator assistance maneuver by providing a position overlay to at least one component of the steer-by-wire steering system to direct the vehicle 10 away from the vehicle 200 and/or the second lane 204.

In some embodiments, the controller 100 may, in response to the ignition on signal, determine, using at least one third value corresponding to the sensors 106, whether the vehicle 10 is moving off of a road being traversed by the vehicle 10, as referenced as 208 in FIG. 3C. The controller 100 may, in response to a determination that the vehicle 10 is moving off of the road being traversed by the host vehicle, perform the at least one operator assistance maneuver.

In some embodiments, the controller 100 may, in response to the ignition on signal, determine, using at least one fourth value corresponding to the sensors 106, whether the vehicle 10 is drifting away from a center 210 of the first lane 202, as is generally illustrated in FIG. 3D. The controller 100 may, in response to a determination that the vehicle 10 is drifting away from the center 210 of the first lane 202, perform at least one other operator assistance maneuver. The controller 100 may perform at least one other operator assistance maneuver by providing lane centering for the vehicle 10. In some embodiments, the lane centering is less than a lane centering threshold.

In some embodiments, the controller 100, as is generally illustrated in FIG. 3A, may take no action, in response to the vehicle 10 drifting out of the first lane 202 to the second lane 204 or the third lane 206, if the controller 100 determines, using the various sensors 106, that there is no danger in the vehicle 10 drifting into the second lane 204, if the vehicle 10 is drifting into the second lane 204 (e.g., with, or without, use of a signal) and/or if the controller 100 determines, using the various sensors 106, that there is no danger in the vehicle 10 drifting into the third lane 206, if the vehicle 10 is drifting into the third lane 206 (e.g., with, or without, use of a signal).

In some embodiments, as is generally illustrated in FIG. 3D, the controller 100 may move the vehicle 10 inside of a lane of travel, if the controller 100 determines, using the various sensors 106, that the vehicle 200 is maneuvering toward the vehicle 10 (e.g., and such maneuver may be dangerous or cause a potential collision with the vehicle 10). The controller 100 may move the vehicle 10 any suitable amount 212 within the lane of travel. The amount 212 may include 75 centimeters or other suitable amount.

Figure 3E:
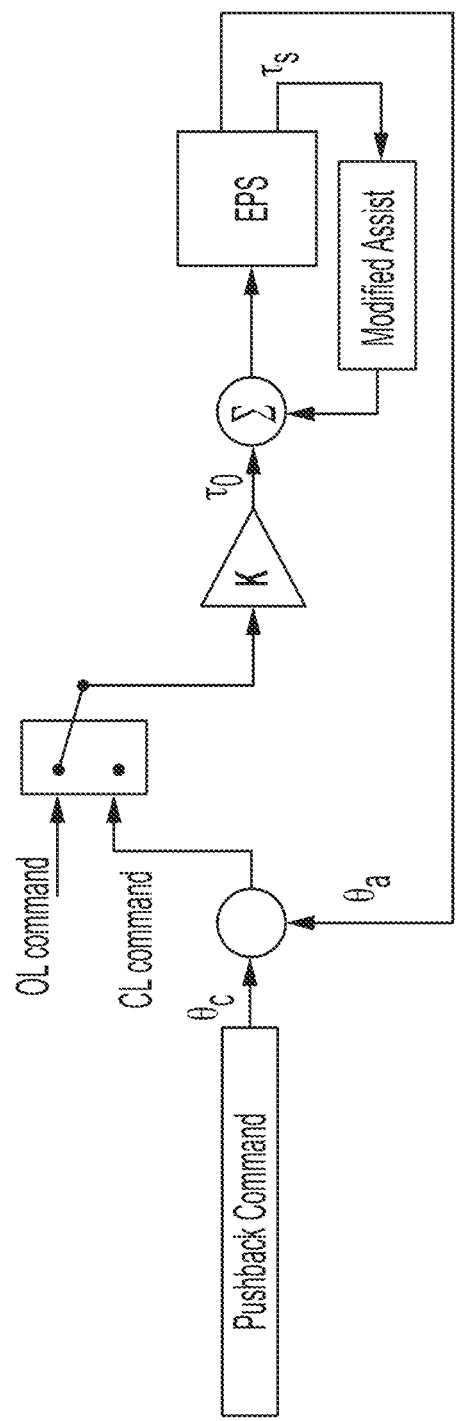

As generally illustrated in FIG. 3E, the controller 100 may be configured to determine a closed-loop (CL) command based on an angle associated with a pushback command and an angle associated with one or more steering signals provided by the EPS of the vehicle 10. The controller 100 may compare the CL command with an open-loop (OL) command. The controller 100 may provide a signal, based on at least one of the CL command and the OL command, to an amplifier K. The controller 100 may determine a sum of an amplified signal from the amplifier K and a modified assist value from the EPS of the vehicle 10. The controller 100 may provide the sum to the EPS of the vehicle 10. The EPS may selective control various aspects of steering of the vehicle 10 based on the sum (e.g., such as providing a pushback assist or other suitable aspects of steering of the vehicle 10>

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
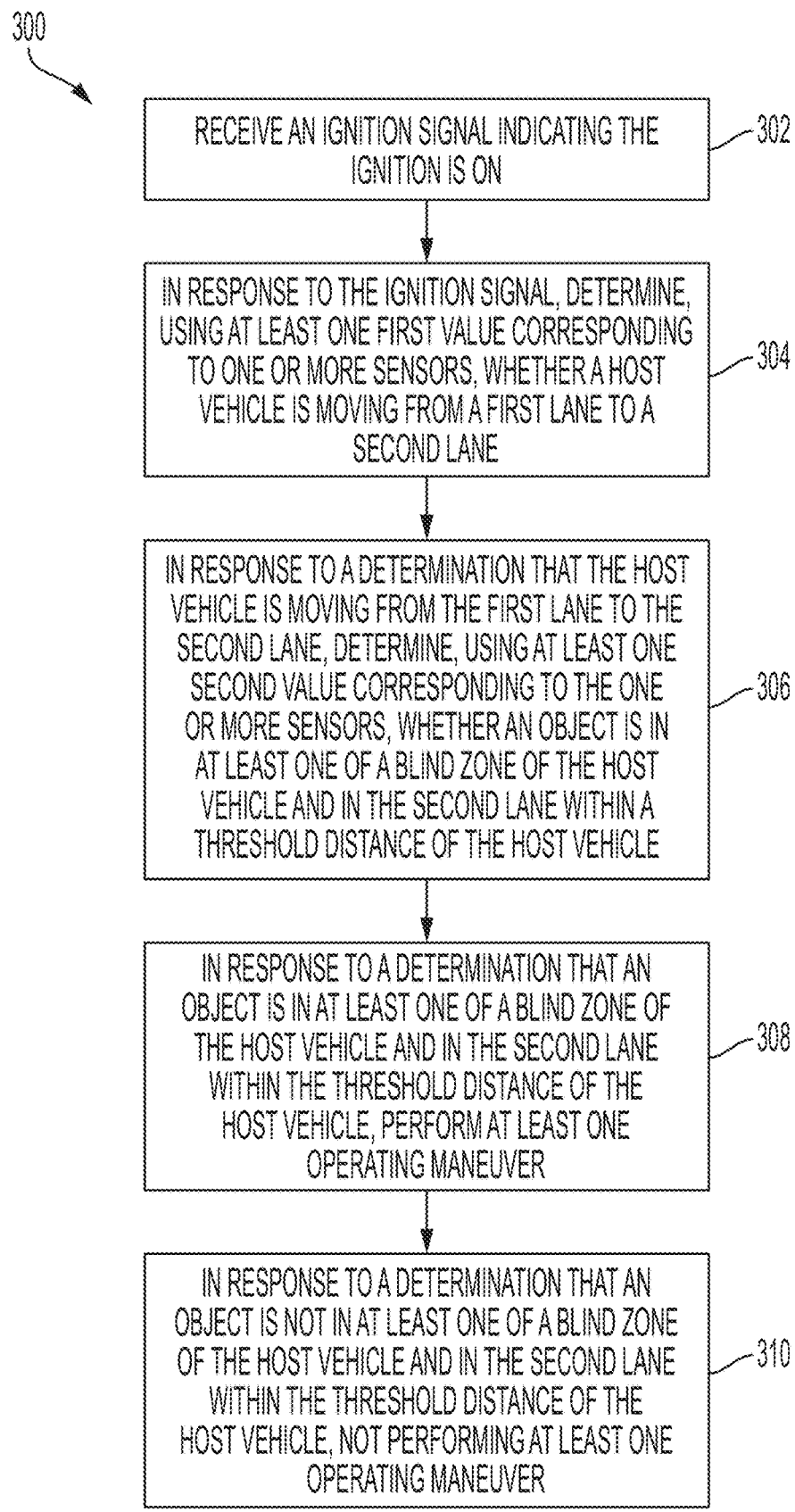
FIG. 4 is a flow diagram generally illustrating a vehicle operator assistance method according to the principles of the present disclosure.

FIG. 4 is a flow diagram generally illustrating a vehicle operator assistance method 300 according to the principles of the present disclosure. At 302, the method 300 receives an ignition signal indicating the ignition of a vehicle is on. For example, the controller 100 may receive the ignition signal indicating that the ignition of the vehicle 10 is no.

At 304, the method 300, in response to an ignition on signal, determines, using at least one first value corresponding to one or more sensors, whether a host vehicle is moving from a first lane to a second lane. For example, in response to an ignition on signal, the controller 100 may determine, using at least one first value corresponding to one or more sensors 106, whether the host vehicle 10 is moving from a first lane 202 to a second lane 204.

At 306, the method 300, in response to a determination that the host vehicle is moving from the first lane to the second lane, determines, using at least one second value corresponding to the one or more sensors, whether an object is in at least one of a blind zone of the host vehicle and in the second lane within a threshold distance of the host vehicle. For example, the controller 100 may, in response to a determination that the host vehicle is moving from the first lane to the second lane, determine, using at least one second value corresponding to the one or more sensors 106, whether the vehicle 200 or other object is in one of a blind zone of the host vehicle 10 or in the second lane 204 within a threshold distance of the host vehicle 10.

At 308, the method 300, in response to a determination that an object is in at least one of the blind zone of the host vehicle and in the second lane within the threshold distance of the host vehicle, performs at least one operator assistance maneuver. For example, the controller 100 may, in response to a determination that the vehicle 200 or other object is in of the blind zone of the host vehicle 10 or in the second lane 204 within the threshold distance of the host vehicle 10, performs at least one operator assistance maneuver.

At 310, the method 300, in response to a determination that an object is not in at least one of the blind zone of the host vehicle and in the second lane within the threshold distance of the vehicle, does not perform the at least one operator assistance maneuver. For example, the controller 100, in response to a determination that the vehicle 200 or other object is not in one of the blind zone of the host vehicle 10 or in the second lane 204 within the threshold distance of the host vehicle 10, does not perform the at least one operator assistance maneuver.

Figure 5:
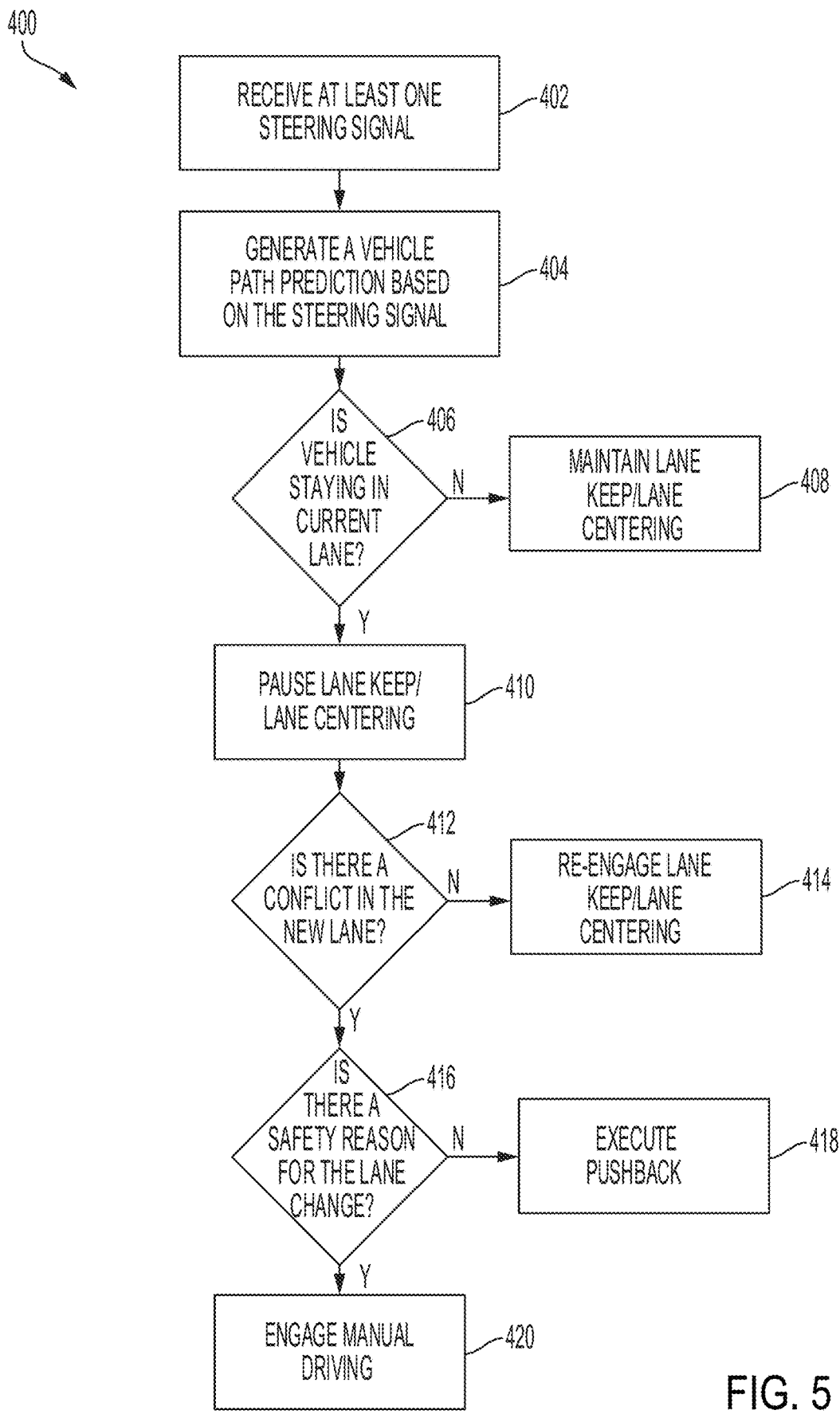
FIG. 5 is a flow diagram generally illustrating an alternative vehicle operator assistance method according to the principles of the present disclosure.

FIG. 5 is a flow diagram generally illustrating an alternative vehicle operator assistance method 400 according to the principles of the present disclosure. At 402, the method 400 receives at least one steering signal. For example, the controller 100 may receive any suitable steering signal, such as those described herein or any other suitable steering signal.

At 404, the method 400 generates a vehicle path prediction based on the at least one steering signal. For example, the controller 100 may generate a path prediction of the vehicle 10 based on the at least one steering signal.

At 406, the method 400 determines whether the vehicle is staying in a current lane. For example, the controller 100 may determine whether the vehicle 10 is staying in the current lane of travel (e.g., based on the at least one steering signal, the path prediction, any other suitable signal or information, or a combination thereof). If the controller 100 determines that the vehicle 10 is staying in the current lane of travel, the method 400 continues at 410. If the controller 100 determines that the vehicle 10 is not staying in the current lane of travel, the method 400 continues at 408.

At 408, the method 400 maintains lane keep and/or lane centering. For example, the controller 100 may continue to provide lane keep features and/or lane centering features (e.g., based on the at least one steering signal, the path prediction, any other suitable signal or information, or a combination thereof).

At 410, the method 400 pauses lane keep and/or lane centering. For example, the controller 100 may pause providing lane keep features and/or lane centering features.

At 412, the method 400 determines whether there is a conflict on the new lane. For example, the controller 100 may determine whether a conflict (e.g., another vehicle, or other object or suitable conflict) in the new lane of travel that the vehicle 10 is transitioning into from the current lane of travel. If the controller 100 determines that there is a conflict in the new lane of travel, the method 400 continues at 416. If the controller 100 determines that there is no conflict in the new lane of travel, the method 400 continues at 414.

At 414, the method 400 re-engages lane keep and/or lane centering. For example, the controller 100 may re-engage lane keep features and/or lane centering features.

At 416, the method 400 determines whether there is a safety reason for the lane change. For example, the controller 100 may determine whether there is a safety reason (e.g., a slow or stopped vehicle, debris, and/or other suitable safety reason) for the lane change to the new lane of travel. If the controller 100 determines that there is a safety reason for the lane change, the method 400 continues at 420. If the controller 100 determines that there is no safety reason for the lane change, the method 400 continues at 418.

At 418, the method 400 executes pushback. For example, the controller 100 executes the pushback features, including providing a pushback assist, described herein.

At 420, the method 400 engages manual driving. For example, the controller 100 engages manual drive, allowing the operator to change lanes without providing a pushback assist.

In some embodiments, a method for providing vehicle operator assistance. The method includes, in response to an ignition on signal: determining, using at least one first value corresponding to one or more sensors, whether a host vehicle is moving from a first lane to a second lane; in response to a determination that the host vehicle is moving from the first lane to the second lane, determining, using at least one second value corresponding to the one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, performing at least one operator assistance maneuver; and, in response to a determination that an object is not in at least one of the blind zone of the host vehicle and in the second lane within the threshold distance of the vehicle, not performing the at least one operator assistance maneuver.

In some embodiments, the object includes a target vehicle. In some embodiments, the host vehicle includes an electronic power steering system. In some embodiments, the at least one operator assistance maneuver includes providing a torque overlay to at least one component of the electronic power steering system to direct the host vehicle away from at least one of the object and the second lane. In some embodiments, the host vehicle includes a steer-by-wire steering system. In some embodiments, the at least one operator assistance maneuver includes providing a position overlay to at least one component of the steer-by-wire steering system to direct the host vehicle away from at least one of the object and the second lane. In some embodiments, the method also includes, in response to the ignition on signal: determining, using at least one third value corresponding to the one or more sensors, whether the host vehicle is moving off of a road being traversed by the host vehicle; and, in response to a determination that the host vehicle is moving off of the road being traversed by the host vehicle, performing the at least one operator assistance maneuver. In some embodiments, the method also includes, in response to the ignition on signal: determining, using at least one fourth value corresponding to the one or more sensors, whether the host vehicle is drifting away from a center of the first lane; and, in response to a determination that the host vehicle is drifting away from the center of the first lane, performing the at least one other operator assistance maneuver. In some embodiments, the at least one other operator assistance maneuver includes providing lane centering for the host vehicle. In some embodiments, the lane centering is less than a lane centering threshold.

In some embodiments, a system for providing vehicle operator assistance includes a processor and a memory. The memory includes instructions that, when executed by the processor, cause the processor to, in response to an ignition on signal: determine, using at least one first value corresponding to one or more sensors, whether a host vehicle is moving from a first lane to a second lane; in response to a determination that the host vehicle is moving from the first lane to the second lane, determine, using at least one second value corresponding to the one or more sensors, whether an object is in at least one of a blind zone of the host vehicle and in the second lane within a threshold distance of the host vehicle; in response to a determination that an object is in at least one of the blind zone of the host vehicle and in the second lane within the threshold distance of the host vehicle, perform at least one operator assistance maneuver; and, in response to a determination that an object is not in at least one of the blind zone of the host vehicle and in the second lane within the threshold distance of the vehicle, not performing the at least one operator assistance maneuver.

In some embodiments, the object includes a target vehicle. In some embodiments, the host vehicle includes an electronic power steering system. In some embodiments, the instructions further cause the processor to perform the at least one operator assistance maneuver by providing a torque overlay to at least one component of the electronic power steering system to direct the host vehicle away from at least one of the object and the second lane. In some embodiments, the host vehicle includes a steer-by-wire steering system. In some embodiments, the instructions further cause the processor to perform the at least one operator assistance maneuver by providing a position overlay to at least one component of the steer-by-wire steering system to direct the host vehicle away from at least one of the object and the second lane. In some embodiments, the instructions further cause the processor to, in response to the ignition on signal: determine, using at least one third value corresponding to the one or more sensors, whether the host vehicle is moving off of a road being traversed by the host vehicle; and, in response to a determination that the host vehicle is moving off of the road being traversed by the host vehicle, perform the at least one operator assistance maneuver. In some embodiments, the instructions further cause the processor to, in response to the ignition on signal: determine, using at least one fourth value corresponding to the one or more sensors, whether the host vehicle is drifting away from a center of the first lane; and, in response to a determination that the host vehicle is drifting away from the center of the first lane, perform at least one other operator assistance maneuver. In some embodiments, the instructions further cause the processor to perform the at least one other operator assistance maneuver by providing lane centering for the host vehicle. In some embodiments, the lane centering is less than a lane centering threshold.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for providing vehicle operator assistance, the method comprising:
   in response to an ignition on signal:
      determining, using at least one first value corresponding to one or more sensors, whether a host vehicle is moving from a first lane to a second lane;
      in response to a determination that the host vehicle is moving from the first lane to the second lane, determining, using at least one second value corresponding to the one or more sensors, whether an object is in at least one of a blind zone of the host vehicle and in the second lane within a threshold distance of the host vehicle;
      in response to a determination that an object is in at least one of the blind zone of the host vehicle and in the second lane within the threshold distance of the host vehicle, performing at least one operator assistance maneuver, wherein the at least one operator assistance maneuver includes providing a position overlay to at least one component of a steering system of the host vehicle to direct the host vehicle away from at least one of the object and the second lane; and
      in response to a determination that an object is not in at least one of the blind zone of the host vehicle and in the second lane within the threshold distance of the vehicle, not performing the at least one operator assistance maneuver.

2. The method of claim 1, wherein the object includes a target vehicle.

3. The method of claim 1, wherein the host vehicle includes an electronic power steering system.

4. The method of claim 3, wherein the at least one operator assistance maneuver includes providing a torque overlay to at least one component of the electronic power steering system to direct the host vehicle away from at least one of the object and the second lane.

5. The method of claim 1, wherein the steering system of the host vehicle includes a steer-by-wire steering system.

6. The method of claim 1, further comprising, in response to the ignition on signal:
   determining, using at least one third value corresponding to the one or more sensors, whether the host vehicle is moving off of a road being traversed by the host vehicle; and
   in response to a determination that the host vehicle is moving off of the road being traversed by the host vehicle, performing the at least one operator assistance maneuver.

7. The method of claim 1, further comprising, in response to the ignition on signal:
   determining, using at least one fourth value corresponding to the one or more sensors, whether the host vehicle is drifting away from a center of the first lane; and
   in response to a determination that the host vehicle is drifting away from the center of the first lane, performing at least one other operator assistance maneuver.

8. The method of claim 7, wherein the at least one other operator assistance maneuver includes providing lane centering for the host vehicle.

9. The method of claim 8, wherein the lane centering is less than a lane centering threshold.

10. A system for providing vehicle operator assistance, the system comprising:
a processor; and
a memory including instructions that, when executed by the processor, cause the processor to:
in response to an ignition on signal:
determine, using at least one first value corresponding to one or more sensors, whether a host vehicle is moving from a first lane to a second lane;
in response to a determination that the host vehicle is moving from the first lane to the second lane, determine, using at least one second value corresponding to the one or more sensors, whether an object is in at least one of a blind zone of the host vehicle and in the second lane within a threshold distance of the host vehicle;
in response to a determination that an object is in at least one of the blind zone of the host vehicle and in the second lane within the threshold distance of the host vehicle, perform at least one operator assistance maneuver, wherein the at least one operator assistant maneuver includes providing a position overlay to at least one component of a steering system of the host vehicle to direct the host vehicle away from at least one of the object and the second lane; and
in response to a determination that an object is not in at least one of the blind zone of the host vehicle and in the second lane within the threshold distance of the vehicle, not performing the at least one operator assistance maneuver.

11. The system of claim 10, wherein the object includes a target vehicle.

12. The system of claim 10, wherein the host vehicle includes an electronic power steering system.

13. The system of claim 12, wherein the instructions further cause the processor to perform the at least one operator assistance maneuver by providing a torque overlay to at least one component of the electronic power steering system to direct the host vehicle away from at least one of the object and the second lane.

14. The system of claim 10, wherein the steering system of the host vehicle includes a steer-by-wire steering system.

15. The system of claim 10, wherein the instructions further cause the processor to, in response to the ignition on signal:
determine, using at least one third value corresponding to the one or more sensors, whether the host vehicle is moving off of a road being traversed by the host vehicle; and
in response to a determination that the host vehicle is moving off of the road being traversed by the host vehicle, perform the at least one operator assistance maneuver.

16. The system of claim 10, wherein the instructions further cause the processor to, in response to the ignition on signal:
determine, using at least one fourth value corresponding to the one or more sensors, whether the host vehicle is drifting away from a center of the first lane; and
in response to a determination that the host vehicle is drifting away from the center of the first lane, perform at least one other operator assistance maneuver.

17. The system of claim 16, wherein the instructions further cause the processor to perform the at least one other operator assistance maneuver by providing lane centering for the host vehicle.

18. The system of claim 17, wherein the lane centering is less than a lane centering threshold.

* * * * *